US006603233B2

(12) United States Patent
Strohm (10) Patent No.: US 6,603,233 B2
(45) Date of Patent: Aug. 5, 2003

(54) ELECTRICAL GENERATOR

(76) Inventor: Bryan W. Strohm, 310 Emerson Ave., Boulder, CO (US) 80305

( * ) Notice: Subject to any disclaimer, the term of this patent is extended or adjusted under 35 U.S.C. 154(b) by 0 days.

(21) Appl. No.: 10/197,768

(22) Filed: Jul. 18, 2002

(65) Prior Publication Data

US 2003/0111925 A1 Jun. 19, 2003

Related U.S. Application Data

(60) Provisional application No. 60/306,841, filed on Jul. 20, 2001.

(51) Int. Cl.$^7$ ................................................ H02K 31/00
(52) U.S. Cl. ........................ 310/178; 310/232; 310/268; 310/112; 310/114
(58) Field of Search ................................. 310/178, 112, 310/114, 164, 165, 268, 255, 232, 233, 234; 322/48

(56) References Cited

U.S. PATENT DOCUMENTS

| | | |
|---|---|---|
| 530,717 A | 12/1894 | Platt |
| 1,465,251 A | 8/1923 | Broluska |
| 2,408,080 A | 9/1946 | Lloyd |
| 2,409,600 A | 10/1946 | Trautschold |
| 2,845,554 A | 7/1958 | Schwab et al. |
| 2,914,688 A | 11/1959 | Matthews |
| 3,084,269 A | 4/1963 | Sayers |
| 3,133,216 A | 5/1964 | Sayers |
| 3,185,877 A | 5/1965 | Sears |
| 3,270,228 A | 8/1966 | Rioux |

(List continued on next page.)

FOREIGN PATENT DOCUMENTS

WO    WO 82/02126    6/1982

OTHER PUBLICATIONS

Lamme, B.G., *Development of a Successful Direct–Current 2000–KW. Unipolar Generator*, Jun. 28, 1912, pp. 1811–1840.
Zeleny, John et al., *Torque on a Cylindrical Magnet Through Which a Current is Passing*, Physical Review, vol. 24, 1924, pp. 544–559.
Kimball Jr., A.L., *Torque on Revolving Cylindrical Magnet*, Physical Review, Ser. 2, vol. 28, 1926, pp. 1302–1308.
Kimballs College Textbook of Physics, A.T. Waterman (Henry Holt & Co. NY 1954) p. 597.
Corson, *Electromagnetic Induction in Moving Systems*, Am. J. Phys., vol. 24, 1956, pp. 126–130. Aug. 15, 1955.
Das Gupta, A.K., *Design of Self Compensated High–Current Comparatively Higher Voltage Homopolar Generators*, Oct. 1961, pp. 567–573.
Das Gupta, A.K., *Commutatorless DC Generators Capable to Supply Currents More than One Million Amperes, and the Effect of Heavy Overload on Them*, A.I.E.E. J., Oct. 1962, pp. 399–402.

(List continued on next page.)

*Primary Examiner*—Thanh Lam
(74) *Attorney, Agent, or Firm*—Clifford W. Browning; Woodard, Emhardt, Moriarty, McNett & Henry LLP (57) ABSTRACT

An improved voltage unipolar generator utilizing a pair of electrically interconnected, counter-rotating, circumferentially segmented, conductive disks. Rolling contacts such as conductive balls or tapered pins are used to electrically interconnect the two counter-rotating disks in a manner that places the majority of the disks' segments in an electrical series. An axially magnetized co-rotating, neodymium-iron-boron permanent magnet having a diameter similar to said disks is the preferred field source. A ferrite disk of appropriate thickness is placed opposite the field source to compress said disks and rolling contacts for optimized electrical interconnection of said disk segments.

5 Claims, 7 Drawing Sheets

U.S. PATENT DOCUMENTS

| | | | |
|---|---|---|---|
| 3,465,187 A | | 9/1969 | Breaux |
| 3,488,533 A | | 1/1970 | Pope |
| 3,594,596 A | | 7/1971 | Eastham |
| 3,616,761 A | * | 11/1971 | Valls .......................... 105/33 |
| 3,699,370 A | | 10/1972 | Caldwell |
| 3,705,995 A | | 12/1972 | Chabrerie |
| 3,736,450 A | | 5/1973 | Emaldi |
| 3,784,853 A | * | 1/1974 | Wangsness ................. 310/178 |
| 3,944,865 A | | 3/1976 | Jewitt |
| 3,989,969 A | * | 11/1976 | Lazaroiu et al. ............ 310/268 |
| 4,021,690 A | | 5/1977 | Burton |
| 4,097,758 A | | 6/1978 | Jenkins |
| 4,321,499 A | * | 3/1982 | Gupta ........................ 310/268 |
| 4,372,633 A | | 2/1983 | Allen et al. |
| 4,514,653 A | | 4/1985 | Batni |
| 4,677,334 A | * | 6/1987 | Finegold et al. ............ 310/268 |
| 4,691,133 A | * | 9/1987 | Mongeau .................... 310/178 |
| 4,866,321 A | * | 9/1989 | Blanchard et al. .......... 310/112 |
| 5,451,825 A | | 9/1995 | Strohm |
| 5,481,149 A | | 1/1996 | Kambe et al. |
| 5,514,923 A | * | 5/1996 | Gossler et al. ................ 310/74 |
| 5,866,967 A | | 2/1999 | Sasaki |
| 5,923,114 A | | 7/1999 | Senni |
| 6,049,150 A | | 4/2000 | Chudleigh, Jr. |

OTHER PUBLICATIONS

Scanlon et al., *Approaches to Electromagnetic Induction*, Am. J. Phys., vol. 37, No. 7, Jul., 1969, pp. 698–708.

Crooks, et al., *One Piece Faraday Generator: A Paradoxical Experiment from 1851*, Am. J. Phys., vol. 46, No. 7, Jul., 1978, pp. 729–731.

Walker, Peter, D.C. Motors—*Characteristics & Applications*, TAB Bks., 1978, ISBN–0–8306–8931–1, pp. 88–94.

Scanlon et al., *Comment on "One–piece Faraday Generator: A Paradoxical Experiment from 1851,"* Am. J. Phys., vol. 47, No. 10, Oct. 1979, pp. 917–918.

Depalma, Bruce E., *The "N" Machine Extraction of Electrical Energy Directly from Space*, Energy Unlimited, No. 5, 1979, pp. 17–25.

Tipler, *"Physics"* 2nd Edition, Worth Publishers, 1982, p. 744.

Pryor, Dale H. et al., *New Promise for an Old Principle*, Jan. 12, 1984, pp. 105–109.

Asian News, *Indian Inventor Harnesses Power from Empty Space*, vol. Issue 6, Apr. 5–11, 1987.

Marinov, Stefan, *Momentum Conservation—Very Easy Demonstration of the Violation of the Angular Momentum Conservation Law and of the Failure of Conventional Electromagnetism*, Raum & Zeit, vol. 2, No. 3, 1991, pp. 73–77.

Butler, Dr. Neal, *Brief Analysis of the Unipolar Generator with ReferenceS from the Internet*, Oct. 18, 1996.

Then, John W., *"Experimental Study of the Motional Electromotive Force*"*, Univ. of Detroit, Detroit, MI, pp. 411–415. Feb. 2, 1962.

Then, John W., *Amplitude, Frequency, and Waveform Control of a Homopolar Generator*, Energy Unlimited 17–18 Double Issue, pp. 61–63. May 1963.

Weisburd, S., *Modeling Magnetism: The Earth as a Dynamo*, Science News, vol. 128, p. 220. 1997.

Pran Technologies Corp., *Unipolar High Frequency Motor Alternator*, Isometric Representation, pp. 1–3. (Jan. 1987)

Pran Technologies Corp., *Permanent Magnet Induction Heating & Cooling System*—Exploded Isometric & Sections p. 1 of 1.

* cited by examiner

ELECTRICAL GENERATOR

This application claims the benefit of prior filed co-pending Provisional Patent application Ser. No. 60/306, 841 Jul. 20, 2001.

BACKGROUND

This invention relates generally to generators of electric current and more particularly to an electric generator having a pair of electrically interconnected disks counter rotating in an axially aligned magnetic field.

Faraday disks or homopolar generators are widely known as producers of large electrical currents at rather low DC voltages (U.S. Pat. Nos. 3,185,877, 3,465,187, 3,705,995, 4,097,758). Lesser known are simplified versions of these wherein the field source co-rotates with the conductive disk(s). Although this "unipolar" generator is a preferred embodiment (mimicking the action of the earth), it seems to present problems in textbook E-M theory (Crooks, Scanlon, Corson, Scanlon).

SUMMARY OF THE INVENTION

Extensive model construction and experimentation with various unipolar generator arrangements (U.S. Pat. No. 5,451,825) demonstrated that a preferred current path exists. In order to overcome the problems of low voltage and secondary field resistance found in prior art machines, the present invention utilizes a torroidial current path.

By electrically connecting (in a series) the inner end points and the outer endpoints of the segments of two segmented conductive disks, a torroidial current path may be achieved. Liquid metal is often used to collect current from unipolar machines (U.S. Pat. No. 3,185,877), however, a liquid brush would short circuit a disk with discrete electrical segments. Sliding contacts such as copper-impregnated carbon brushes (commonly used in conventional D.C. motor generators) could be used here, but the required number of them at both inner and outer radii would cause substantial mechanical drag. The preferred brush system here is a rolling brush system. Rolling brushes have been used in electrical machines for over 100 years (U.S. Pat. No. 530, 717), yet they have never been used to interconnect two commutators as they are used in the present invention. For ease of construction, a lower current machine can be made using conductive balls, but tapered conductive pins are the preference for a higher current machine.

A preferred embodiment of the present invention is a machine that would generate electricity for industrial or consumer use. The present invention has been designed to meet growing demands for electrical energy by having a higher energy density and by utilizing recently discovered magnetic field phenomena. The present invention produces D.C. electricity by means of electromagnetic induction. The present invention is not a refinement of existing D.C. generator machines. The present invention is an entirely new configuration of inductive elements with respect to a primary field source. The most similar generator types are homopolar, acyclic, or unipolor generators. Unrecognized by most scientists is the unipolar generator. Any conductive permanent magnet spun on its axis of magnetization is a unipolar generator. The present invention is a complex version of a unipolar generator. By incorporating an intricate rolling brush-commutator and specially segmented disks, the present invention has a greatly increased voltage and substantially reduced back EMF over other unipolar generators.

The preferred embodiment of the improved voltage unipolar generator of the present invention utilizes a pair of electrically interconnected, counter-rotating, circumferentially segmented, conductive disks. Rolling contacts, such as conductive balls or tapered pins, are used to electrically interconnect the two counter-rotating disks in a manner that places the majority of the disks' segments in an electrical series. An axially magnetized co-rotating, neodymium-iron-boron permanent magnet having a diameter similar to said disks is the preferred field source. A ferrite disk of appropriate thickness is placed opposite the field source to compress said disks and rolling contacts for optimized electrical interconnection and counter-rotation of said disk segments.

DETAILED DESCRIPTION OF THE PREFERRED EMBODIMENTS

The efficiency of the preferred embodiment of the present invention will be determined by the precision of construction of the rolling brush system, and the uniformity of the secondary field arrangement.

Figure 1:
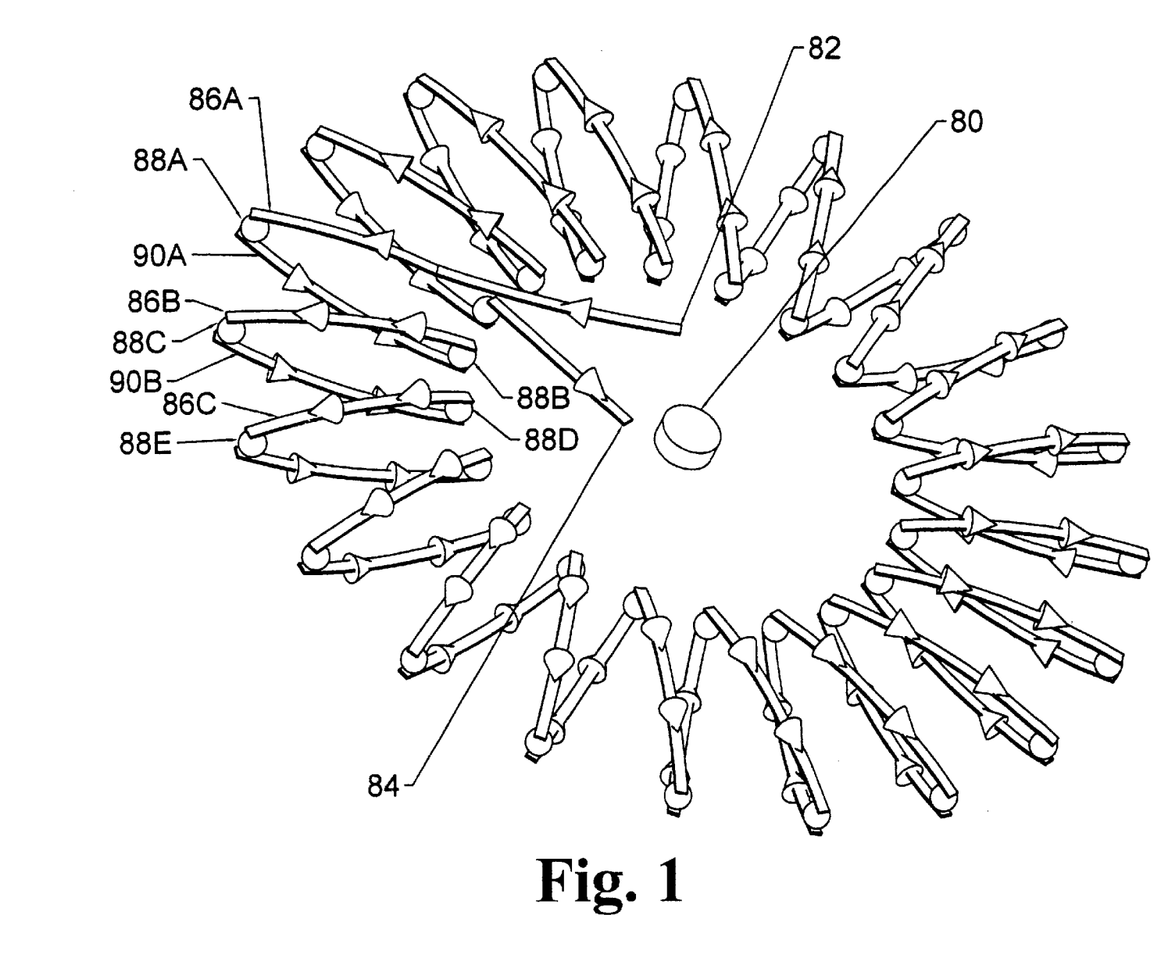
FIG. 1 is an example of the torroidal current path around which this invention is designed. This torroidal current path with counter-rotating faces produces a secondary field that is highly desirable for electrical energy production.

FIG. 1 shows an embodiment of a torroidal current path. This special current path is the core of this invention. Electricity is induced to flow into the torroid at point 82. The current is induced to flow in the direction of the arrows in element 86A. The current then crosses commutator means 88A (this embodiment shows a rolling type commutator) and then the current is induced to flow in the direction of the arrows along element 90A. Elements 86A, 86B, 86C–86N are all mounted on a disk that is rotatable around central shaft 80, when this rotation occurs in the presence of the appropriate primary field, induction occurs along the elements in the direction of the arrows. Similarly elements 90A, 90B, 90C, etc. are mounted on a disk free to rotate about central shaft 80. When counter rotation occurs in this disk in the presence of the primary magnetic field, electricity is induced to flow in the direction of the arrows in these elements. Rolling contacts 88A, 88B, 88C, 88D, 88E etc. complete the torroidal current path allowing the current to exit the torroid at point 84.

Figure 2:
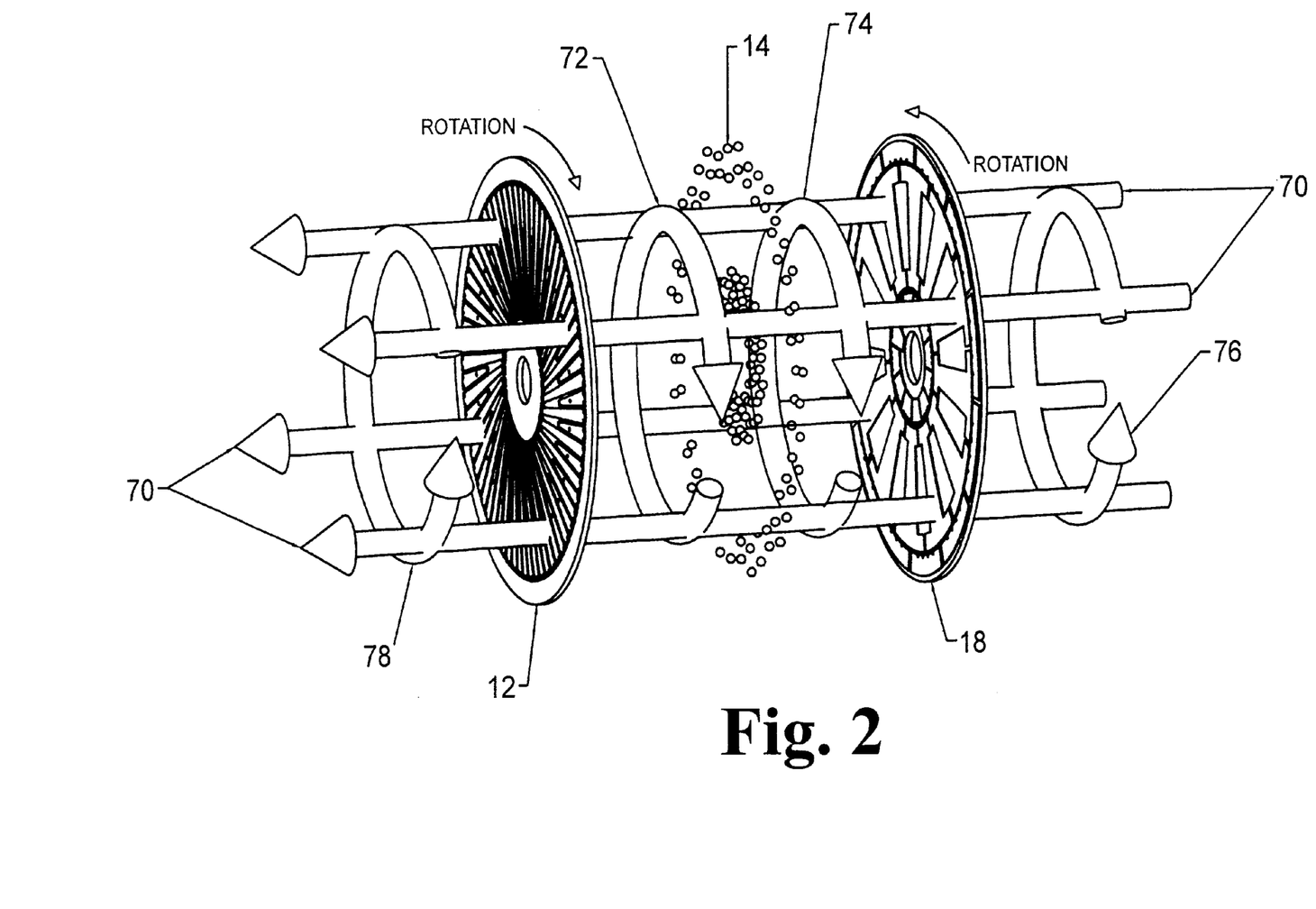
FIG. 2 is an exploded representation of the primary and secondary magnetic fields occurring as electrical current is induced to flow through the torroidal current path of FIG. 1 in this embodiment of the invention.
Figure 3A:
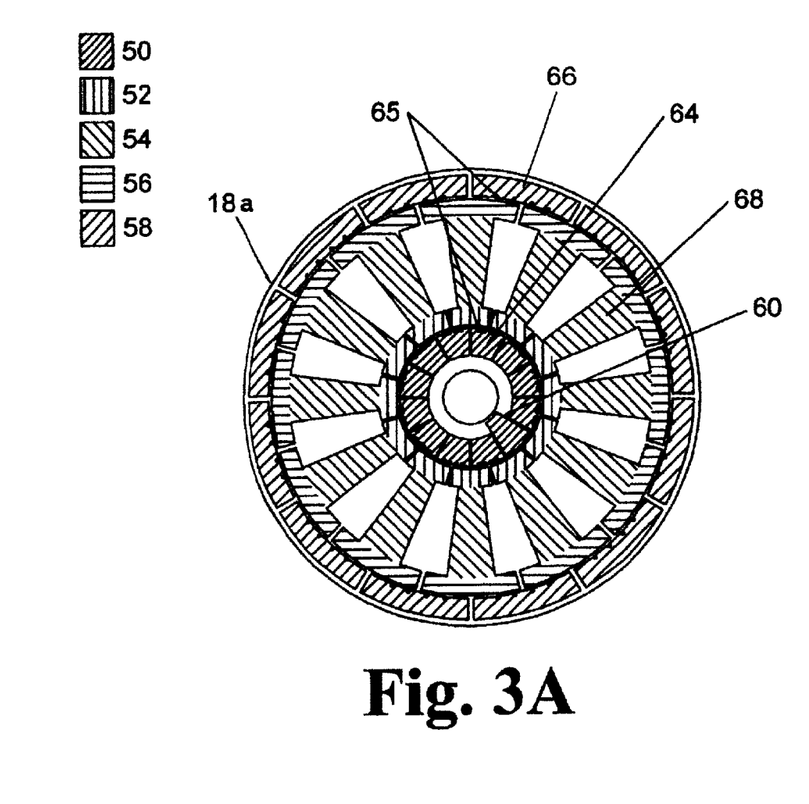
FIGS. 3A and 3B are the inner and outer sides of an embodiment of a disk having conductive elements that constitute a portion of the torroidal current path of FIG. 1.
Figure 3B:
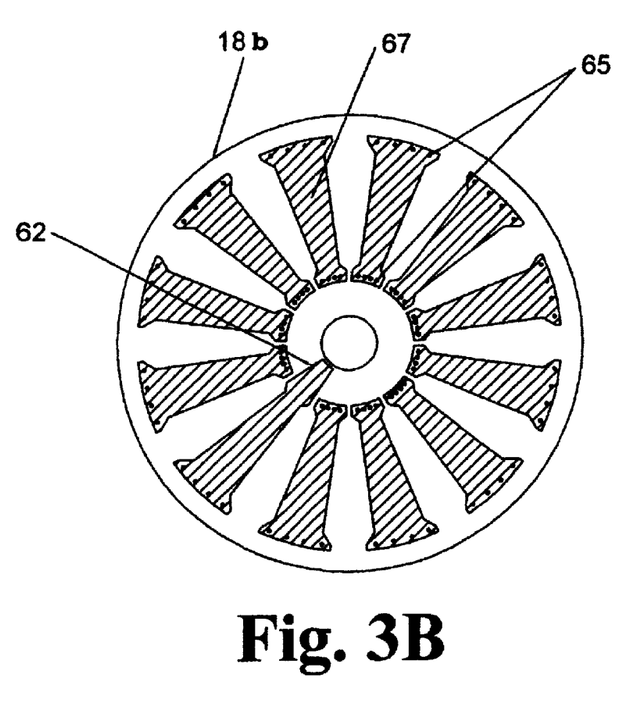
Figure 4A:
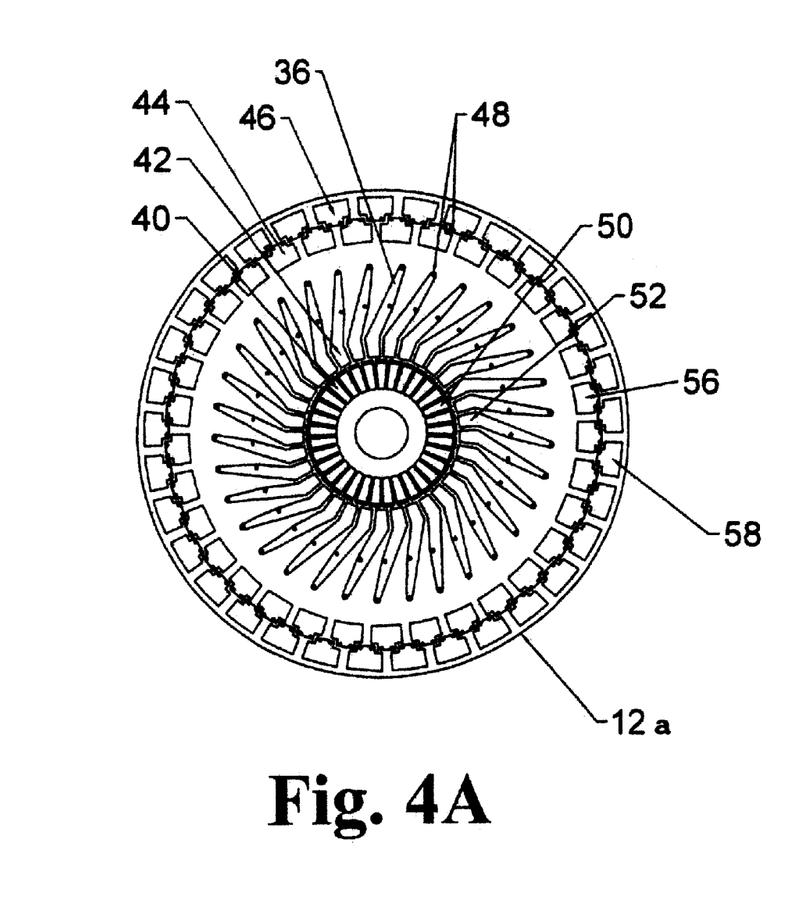
FIGS. 4A and 4B are the two sides of a disk designed to electrically interconnect with the disk of FIG. 3 in a manner which (using rolling brushes in this embodiment) will produce the desired torroidal current path of FIG. 1 independent of its radial alignment with the disk of FIG. 3.
Figure 4B:
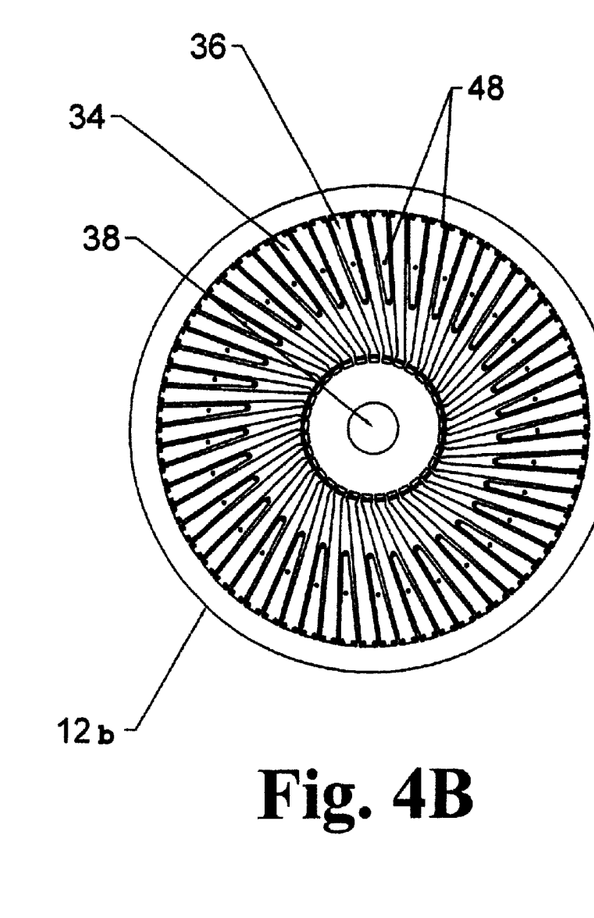

Two segmented conductive disks 12 and 18 are electrically interconected by commutator means 14 in a manner that produces a single current path through the two disks independent of the relative position of the two disks. As the disks counter rotate in the axial primary field 70, current is induced outward radially on one disk and inward radially on the other.

The current in this machine traverses the majority of inductive elements in each disk in a series producing a complex and important secondary field arrangement and substantially improving the voltage of this machine. The uniformly radial current in disk 12 produces secondary fields 72 and 78 while the uniformly radial current in disk 18 produces secondary fields 74 and 76. The special geometry of this machine aligns secondary fields 72, 74, 76, and 78 substantially perpendicular to primary field 70, greatly reducing back EMF in this invention. Note that secondary fields 72 and 74 between counter rotating disks 12 and 18 are in the same direction reducing magnetic drag in this machine. This embodiment of disk 18 utilizes a disk made of circuit board stock having two sides 18A and 18B. Side 18A having 4 commutator paths 50, 52, 56, and 58. Commutator tab 64 is electrically connected to commutator tab 66 by through holes 65 and their connection to inductive element 67 on side 18B. Having 12 inductive elements on each side of disk 18 all being placed in series with 24 similar inductive elements on disk 12, the voltage of this embodiment will be substantially 48 times that of a similar sized unipolar generator. Solder tabs 60 and 62 will lead to slip rings for the collection of electricity. Although disk 18 has 24 discrete radial elements such as 67 and 68, they will all be in electrical series when this machine is assembled and rotated. Disk 12 is designed to complete the circuit of disk 18 by facing it with matching commutator rings 50, 52, 56, and 58 on side 12*a*. Comutator tab 40 is electrically connected to tab 44 through holes 48 and radial element 34 on side 12*b*. Similarly tab 42 is electrically connected to tab 46 and holes 48 through radial inductor 36. More radial elements are necessary on this disk than on disk 18 in order to maintain a continuous output current. During counter rotation, typically 8/11 of the elements on disk 12 are in use at a given moment. Center hole 38 must be able to center the disk on a bearing for counter-rotation.

Figure 5:
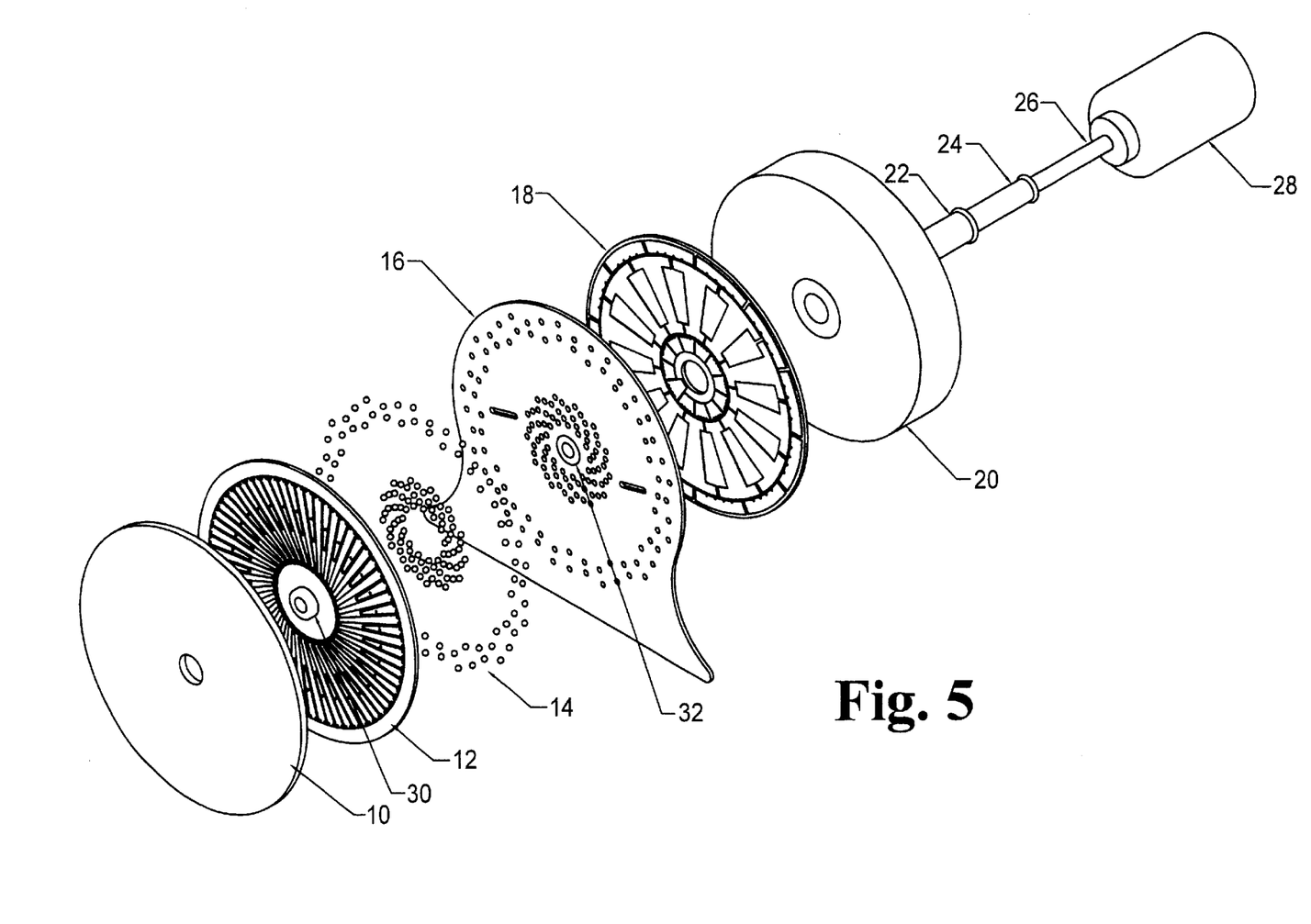
FIG. 5 shows all of the parts necessary to construct a simple embodiment of the invention in an exploded view.
Figure 6:
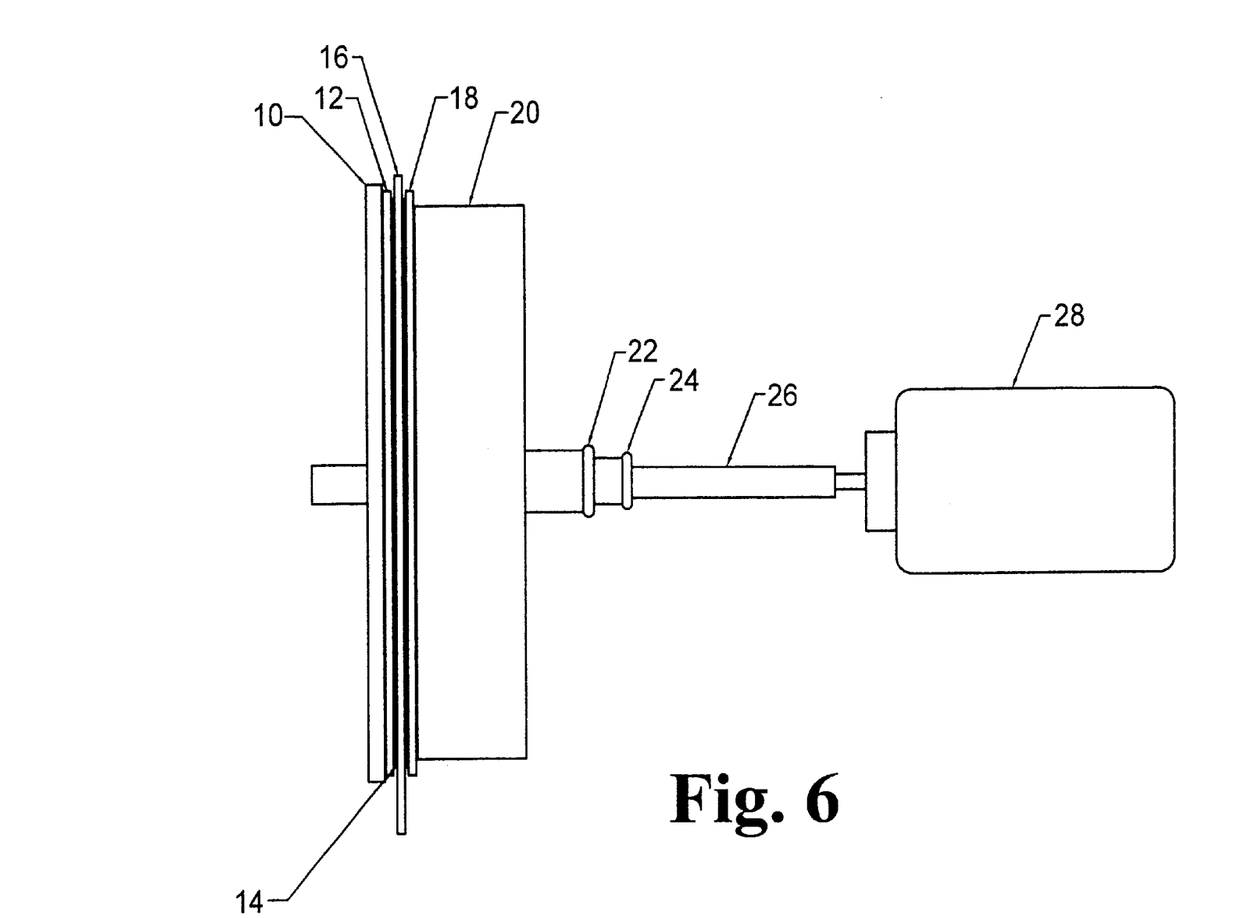
FIG. 6 shows a side view of a simple embodiment of the invention assembled.

FIG. 5 shows an exploded view of the basic necessary components required to construct this invention. Embodiments of this invention must include an axially aligned field source 20 mounted on a shaft 26 that is driven by prime mover 28, slip rings 22 and 24 being connected to tabs 60 and 62 provide the means to extract current from the machine. Commutator disk 16 and prime mover 28 are rigidly mounted to a base and support the ends of shaft 26. Bearing 32 allows shaft 26 to freely rotate therein. Disk 10 is constructed of ferrite or other magnetically attractive material and is coated with plastic, or other electrically insulative material. Disk 10 is thereby in attraction to field source 20 and provides the compressive force needed to electrically interconnect and counter-rotate disks 12 and 18 through rolling conductors 14 with an appropriate pressure. Bearing 30 allows disks 10 and 12 to counter-rotate around shaft 26. As field source 20 and disk 18 co-rotate (in unipolar fashion) the compressive force on rolling contacts 14, due to the magnetic attraction between field source 20 and ferrite disk 10, causes rolling contacts 14 to spin inside their respective holes in commutator disk 16. This action causes the counter rotation of disks 10 and 12 inducing additional voltage in disk 12. Field source 20 could be either a field winding (coil) or a permanent magnet.

Figure 7:
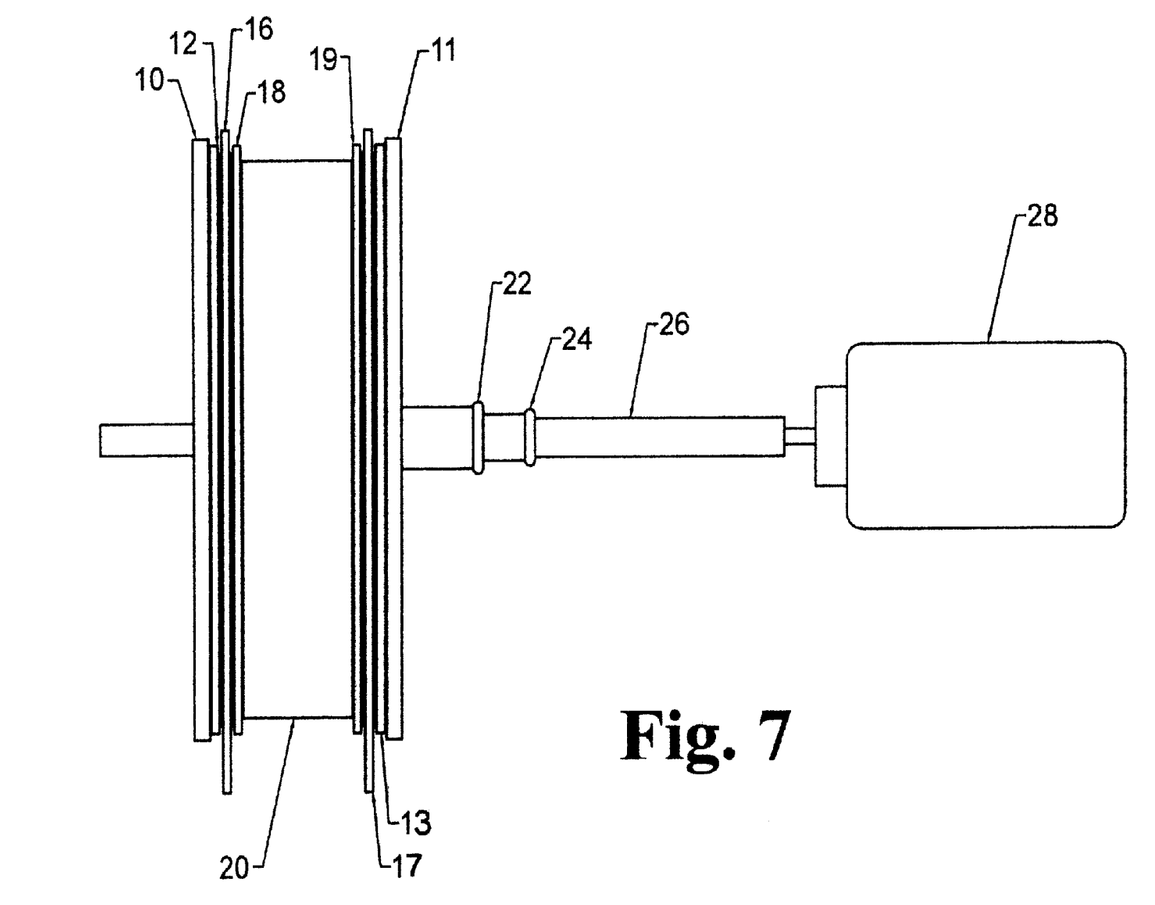
FIG. 7 shows a side view of a more complex embodiment that utilizes more of the existing magnetic field, producing twice the electrical power.

Embodiment #2 (FIG. 7) shows a higher energy density machine by taking advantage of the magnetic field on both sides of a field source 20. This embodiment produces twice the electrical DC output at points 22 and 24. Solder tabs on disks 18 and 19 are interconnected in either series or parallel (as is required by the load on the embodiment) and then connected to slip rings 22 and 24 for twice the output wattage.

This source of DC electrical energy is derived from classical electromagnetic induction phenomenon in a very special geometry. The necessary requirements for this geometry are:

1) A primary field source; either a coil or a permanent magnet, but a permanent magnet is preferred.

2) This field source is mounted on a shaft that is driven by an external power source and that drives this generator. The field source is centered on the shaft and the field aligned with the shaft. The field source may freely rotate on a bearing but it is preferably fixed to the shaft.

3) A disk carrying numerous discrete conductive radial elements is fixed to the shaft adjacent the field source. Each radial element having an inner and an outer brush surface. A preferred brush surface is designed to mate with a brush device in a manner enabling a maximized current to flow between opposing brush surfaces.

4) A second (preferably counter-rotating) disk carrying similar conductive radial elements and brush surfaces is mounted on a bearing on the shaft facing the first disk. The brush surfaces of this second disk are at radii that match those of the first disk. Between the two counter-rotating disks is a brush device that could be a sliding type brush, but a rolling-type brush of either conductive balls or conductive pins is the preferred embodiment.

I claim:

1. An electrical generator comprising a pair of electrically interconnected, circumferentially segmented and conductive disks counter-rotating in an axially aligned magnetic field;

rolling contacts electrically interconnected to two counter-rotating conductive disks, whereby a majority of the circumferential segments are connected in electrical series, creating a single torroidal current path;

an axially magnetized, co-rotating permanent magnet having a diameter similar to the conductive disks forming a field source; and a ferrite disk placed opposite the field source compressing the conductive disks and rolling contacts whereby optimal electrical interconnection and counter-rotation of the circumferential segments of the conductive disks is produced.

2. The electrical generator of claim 1 wherein the rolling contacts are selected from the group consisting of tapered conductive pins and conductive balls.

3. The electrical generator of claim 1 wherein the permanent magnet is replaced by a field winding.

4. The electrical generator of claim 1 and further comprising disk pairs, or multiple disk pairs, on both sides of the field source.

5. The electrical generator of claim 1 and further comprising multiple disk pairs on either side of the field source.

\* \* \* \* \*